(12) United States Patent
Shibata

(10) Patent No.: US 11,550,520 B2
(45) Date of Patent: Jan. 10, 2023

(54) RELAY SERVER AND NON-TRANSITORY COMPUTER-READABLE RECORDING MEDIUM STORING COMPUTER-READABLE INSTRUCTIONS FOR RELAY SERVER FOR RELAYING COMMUNICATION BETWEEN COMMUNICATION DEVICE AND SERVICE PROVIDING SERVER

(71) Applicant: BROTHER KOGYO KABUSHIKI KAISHA, Nagoya (JP)

(72) Inventor: Takeshi Shibata, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 7 days.

(21) Appl. No.: 17/213,542

(22) Filed: Mar. 26, 2021

(65) Prior Publication Data
US 2021/0303228 A1  Sep. 30, 2021

(30) Foreign Application Priority Data

Mar. 30, 2020 (JP) .............................. JP2020-060233

(51) Int. Cl.
*H04N 1/46* (2006.01)
*G06F 3/12* (2006.01)

(52) U.S. Cl.
CPC .......... *G06F 3/1206* (2013.01); *G06F 3/1244* (2013.01); *G06F 3/1287* (2013.01)

(58) Field of Classification Search
CPC ..... G06F 3/1285; G06F 3/1288; G06F 21/606

USPC .................. 358/1.15, 407; 709/203, 219
See application file for complete search history.

(56) References Cited

U.S. PATENT DOCUMENTS

| | | | |
|---|---|---|---|
| 6,684,052 B2* | 1/2004 | Kucinski ............ | G06K 17/0032 382/311 |
| 2012/0117629 A1 | 5/2012 | Miyazawa et al. | |
| 2013/0139225 A1* | 5/2013 | Saito ..................... | G06F 21/608 726/4 |
| 2018/0183781 A1 | 6/2018 | Miyazawa et al. | |

FOREIGN PATENT DOCUMENTS

| | | |
|---|---|---|
| JP | 2012-113696 A | 6/2012 |
| JP | 2015-53611 A | 3/2015 |

* cited by examiner

*Primary Examiner* — Jamares Q Washington
(74) *Attorney, Agent, or Firm* — Scully, Scott, Murphy & Presser, PC

(57) ABSTRACT

The relay server may receive a first service request from a communication device and send, in a case where the first service request, is received from the communication device, a sending instruction to the communication device. The sending instruction may be for instructing to send first target data to a first service providing server. In a case where the communication device receives the sending instruction from the relay server, the communication device may send the first target data to the first service providing server without an intervention of the relay server. The relay server may receive a second service request from the communication device and send, in a case where the second service request is received from the communication device, the second target data received from the communication device to the second service providing server.

18 Claims, 9 Drawing Sheets

FIG. 2

Service Table 38

| Service ID | Scan Setting (First Embodiment) | Access Token |
|---|---|---|
| sv1 | - | AT1 |
| sv2 | A4, 300dpi | AT11 |

Mediation Table 438

| Device ID | Service ID | Management ID | Destination URL | Access Token | Job ID | One Time Key |
|---|---|---|---|---|---|---|
| dv1 | sv1 | - | URL50 | AT1 | - | - |
| dv1 | sv2 | mn1 | URL70 | AT2 | job1 | ppp |
| ... | ... | ... | ... | ... | ... | ... |

Job Table 440

| Job ID | Print Data | Storing Destination URL |
|---|---|---|
| job1 | PD1 | URL64 |
| ... | ... | ... |

Management Table 538

| Device ID | Management ID | Access Token |
|---|---|---|
| dv1 | mn1 | AT11 |
| ... | ... | ... |

(Scan Process Using Storing Service)

(Continuation of FIG. 4)

(Scan Process Using Education Service)

RELAY SERVER AND NON-TRANSITORY COMPUTER-READABLE RECORDING MEDIUM STORING COMPUTER-READABLE INSTRUCTIONS FOR RELAY SERVER FOR RELAYING COMMUNICATION BETWEEN COMMUNICATION DEVICE AND SERVICE PROVIDING SERVER

CROSS-REFERENCE TO RELATED APPLICATION

This application claims priority to Japanese Patent Application No. 2020-060233, filed on Mar. 30, 2020, the entire contents of which are hereby incorporated by reference into the present application.

TECHNICAL FIELD

The present disclosure discloses a relay server configured to relay communication between a communication device and a service providing server.

BACKGROUND ART

A communication system including an MFP (Multi-Function Peripheral), a relay device, and a service providing device. When receiving an upload destination URL acquisition request from the MFP, the relay device sends an upload destination URL request to the service providing device. Then, when receiving the upload destination URL, from the service providing device, the relay device sends the upload destination URL to the MFP. When receiving the upload destination URL from the relay device, the MFP reads an image of a document, and creates an electronic file of the image. Then, the MFP sends the electronic file to the service providing device by using the upload destination URL. Thereby, the electronic file is uploaded to the service providing device.

SUMMARY

The technology described above only assumes that an electronic file is sent to a service providing server from an MFP without an intervention of a mediation device. The present disclosure provides a technology for sending target data from a communication device to each of first and second service providing servers by different methods.

A relay server disclosed in the disclosure may comprise: one or more controllers configured to: receive a first service request from a communication device, the first service request being a signal for requesting provision of a first service from a first service providing server, the first service being a service to store first target data sent by the communication device in the first service providing server; in a ease where the first service request, is received from the communication device, send a sending instruction to the communication device, the sending instruction being for instructing to send the first target data to the first service providing server, wherein in a case where the communication device receives the sending instruction from the relay server, the communication device sends the first target data to the first service providing server without an intervention of the relay server; receive a second service request from the communication device, the second service request being a signal for requesting provision of a second service from a second service providing server different from the first service providing server, the second service being a service to execute image analysis of second target data sent by the communication device and output a result of the image analysis; and in a case where the second service request is received from the communication device, send the second target data received from the communication device to the second service providing server.

Further, another relay server disclosed in the disclosure may comprise: one or more controllers configured to: receive a first service request from a communication device, the first service request being a signal for requesting provision of a first service from a first service providing server, the first service request not including first target data to be sent from the communication device to the first service providing server; in a case where the first service request is received from the communication device, send a sending instruction to the communication device, the sending instruction being for instructing to send the first target data to the first service providing server, wherein in a case where the communication device receives the sending instruction from the relay server, the communication device sends the first target data to the first service providing server without an intervention, of the relay server; receive a second service request front the communication device, the second service request being a signal for requesting provision of a second service from a second service providing server different from the first service providing server, the second service request including second target data to be sent from the communication device to the second service providing server; and in a case where the second service request is received from the communication device, send to the second service providing server the second target data included in the second service request.

A control method and a computer program for implementing the above relay server, and a computer-readable medium storing the computer program are also novel and useful. Moreover, a communication system comprising the above relay server, a communication device, a first service providing server, and a second service providing server are also novel and useful.

BRIEF DESCRIPTION OF THE DRAWINGS

FIG. 2 shows tables.

EMBODIMENTS

Figure 1:
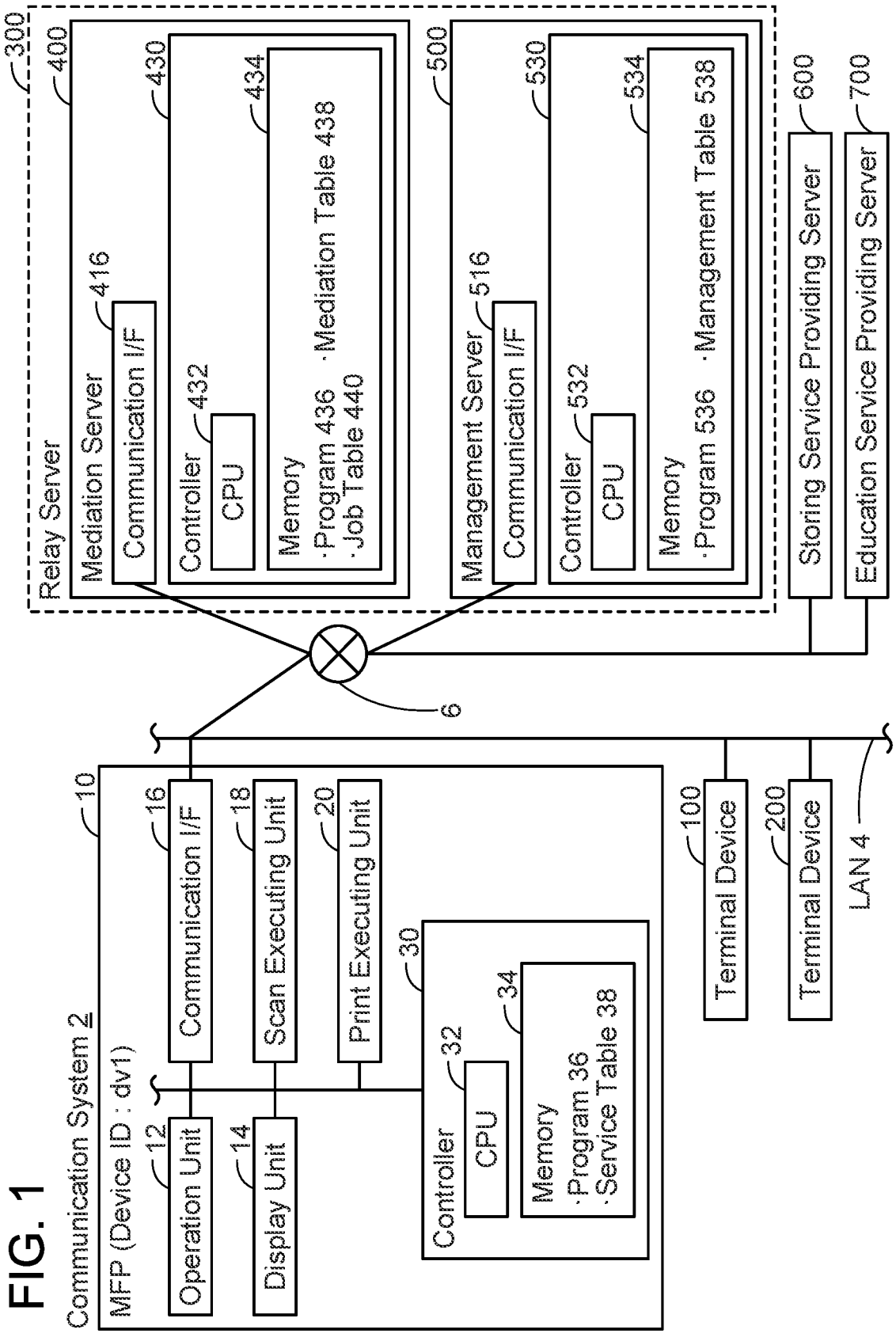
FIG. 1 shows the configuration of a communication system.

First Embodiment (Configuration of Communication System 2; FIG. 1)

As shown, in FIG. 1, a communication system 2 includes an MFP 10, a plurality of terminal devices 100, 200, a relay server 300, and a plurality of service providing servers (hereinbelow termed "SP server") 600, 700. The MFP 10 and the terminal devices 100, 200 are connected with a LAN (Local Area Network) 4. The LAN 4 is connected with the Internet 6. The MFP 10 and the terminal devices 100, 200 are configured to communicate with each other via the LAN 4. The servers 3(h), 600, 700 are connected with the Internet 6. The MFP 10, the terminal devices 100, 200, and the servers 300, 600, 700 are configured to communicate with each other via the Internet 6.

(Configuration of MFP 10)

The MFP 10 is a peripheral device (e.g., a peripheral device of a PC, etc.) configured to execute multiple functions including a print function, and a scan function. The MFP 10 includes an operation unit 12, a display unit 14, a communication interface (hereinbelow, interlace is termed "I/F") 16, a scan executing unit 18, a print executing unit 20, and a controller 30. A device ID "dv1" is assigned to the MFP 10.

The operation unit 12 includes a plurality of keys. A user can input various instructions to the MFP 10 by operating the operation unit 12. The display unit 14 is a display for displaying various types of information. The communication I/F 16 is connected with the LAN 4, the communication I/F 16 may be a wireless I/F, or may be a wired I/F. The scan executing unit 18 includes a scanning mechanism such as a CCD and CIS. The print executing unit 20 includes a printing mechanism of an inkjet scheme, laser scheme, or the like.

The controller 30 includes a CPU 32 and a memory 34. The CPU 32 executes various processes in accordance with a program 36 stored in the memory 34. The memory 34 is constituted of a volatile memory, a non-volatile memory, and the like. The memory 34 further stores a service table 38.

(Configurations of Terminal Devices 100, 200)

The terminal devices 100, 200 are portable devices such as a cellphone, a smartphone, a PDA, a portable music player, or a portable video player. The terminal devices 100, 200 are connected with the LAN 4. The terminal device 100 is a device used by a worker (hereinbelow termed "serviceman") belonging to a business operator that provides a service realized by the education SP server 700. The terminal device 200 is a device used by the user who uses the MFP 10.

(Configuration of Relay Server 300)

The relay server 300 is installed on the internet 6 by a vendor of the MFP 10. In a variant, the relay server 300 may be installed on the Internet 6 by a business operator different from the aforementioned vendor. The relay server 300 is a server that relays communication between, the MFP 10 and the SP servers 600, 700 on the Internet 6. The relay server 300 includes a mediation server 400 and a management server 500.

The mediation server 400 is a server that mainly executes communication with the SP servers 600, 700 on the Internet 6. The mediation server 400 includes a communication I/F 416 and a controller 430. The controller 430 includes a CPU 432 and a memory 434. The CPU 432 executes various processes in accordance with a program 436 stored in the memory 434. Tire memory 434 is constituted of a volatile memory, anon-volatile memory, and the like. The memory 434 further stores a mediation table 438 and a job table 440.

The management server 500 is a server that mainly executes communication with the MFP 10. The management server 500 includes a communication. I/F 516 and a controller 530. The controller 530 includes a CPU 532 and a memory 534. The CPU 532 executes various processes in accordance with a program 536 stored in the memory 534. The memory 534 is constituted of a volatile memory, a non-volatile memory, and the like. The memory 534 further stores a management table 538.

(Configuration of SP Servers 600, 700)

The SP servers 600, 700 are installed on the Internet 6 by a vendor different from the vendor who installs the relay server 300. The storing SP server 600 provides a service of storing in the storing SP server 600 (hereinbelow termed "storing service") image data (e.g., scan data) acquired from an MFP (e.g., 10). The education SP server 700 provides a service relating to education (hereinbelow termed "education service"). Specifically, the education SP server 700 supplies image data corresponding to question and answer sheets to an MFP (e.g., 10), and causes the MFP to print these sheets. Then, the education SP server 700 acquires image data (e.g., scan data) corresponding to completed answer sheep's) from the MFP, executes image analysis to score the answer sheet(s), and outputs an image analysis result (i.e., a scored result).

(Configuration of Tables; FIG. 2)

Next, the contents of the service table 38 in the MFP 10, the mediation table 438 and the job table 440 in the mediation server 400, and the management table 538 in the management server 500 will be described with reference to FIG. 2.

One or more pieces of service information are stored in the service table 38 in the MFP 10. The service information includes a service ID (e.g., "sv1") for identifying an SP server, a scan setting (e.g., "A4, 300 dpi"), and an access token (e.g., "AT1"). The service ID of the storing SP server 600 and the service ID of the education SP server 700 are "sv1", "sv2", respectively. The scan setting is information to be used when a document placed on the MFP 10 is scanned, and includes paper size, resolution, and the like. The access token is authentication information used by the relay server 300.

One or more pieces of mediation information are stored in the mediation table 438 in the mediation server 400. The mediation information includes a device ID (e.g., "dv1") for identifying a device, a service ID (e.g., "sv1"), a management ID (e.g., "mn1"), a destination Uniform Resource Locator (URL) (e.g., "URL 50"), an access token (e.g., "AT1"), a job ID (e.g., "job1"), and a one time key (e.g., "ppp"). The management. ID is information generated by the management server 500, and is information tor identifying a partner with whom the management server 500 is to execute communication. The destination URL is information indicating a URL to be accessed in order to receive provision of a service from the SP server. The job ID is information for identifying print data. The one time key is a password that is valid for a predetermined period after issuance of the one time key, and can be used only once.

One or more pieces of job information are stored in the job table 440 in the mediation server 400. The job information includes a job ID (e.g., "job1"), print data (e.g., "PDF"), and a storing destination URL (e.g., "URL 64") indicating a position of the print data.

One or more pieces of management information are stored in the management table 538 in the management, server 500.

Figure 3:
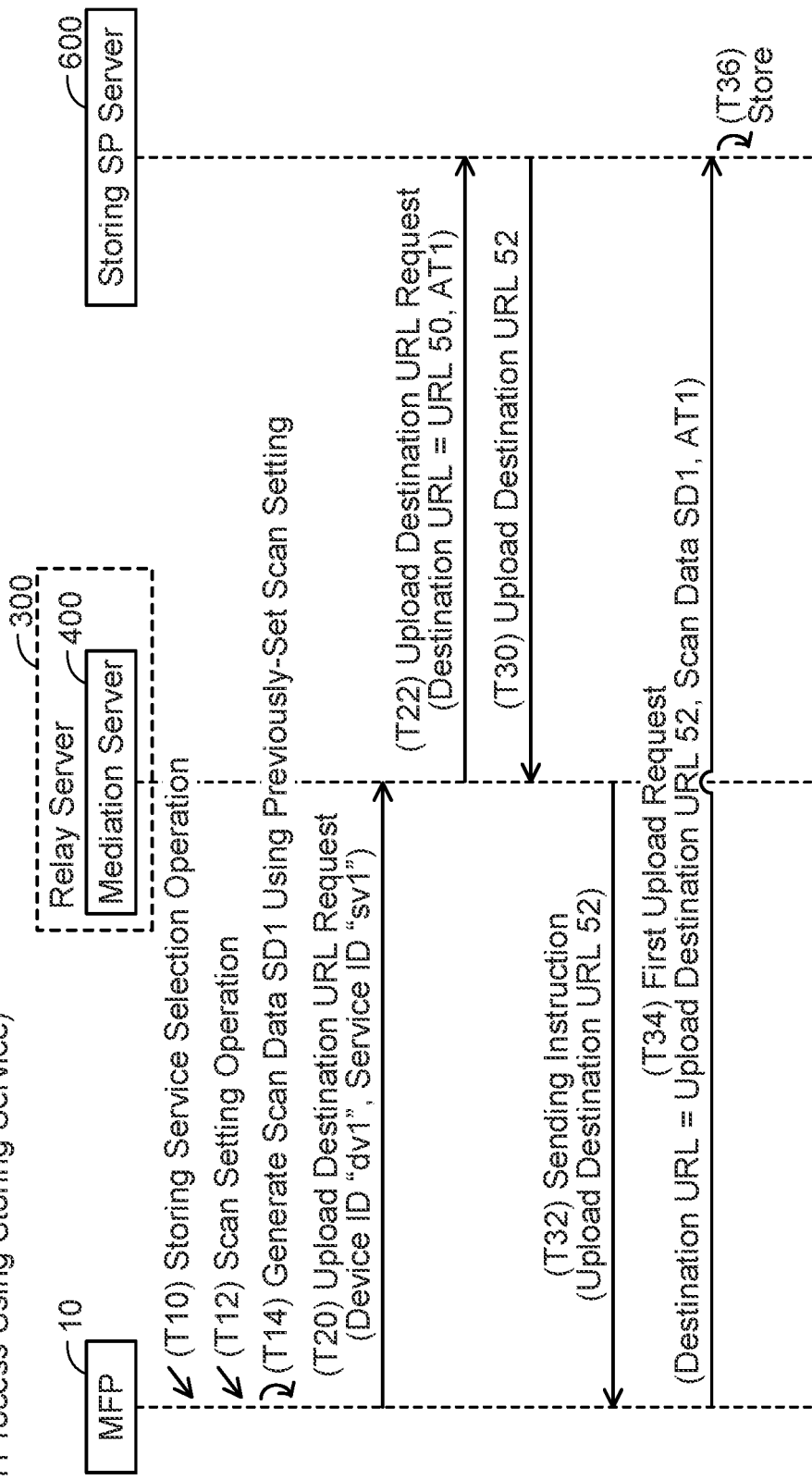
FIG. 3 shows a sequence view of a scan process using a storing service.

The management information includes a device ID (e.g., "dv1"), a management ID (e.g., "mn1"), and an access token (e.g., "AT11"), (Scan Process Using Storing Service; FIG. 3)

Next, a scan process in which scan data is stored in the storing SP server 600 will be described with reference to FIG. 3. Hereinbelow, to facilitate understanding, processes executed by the CPU of each device (e.g., the CPU 32 of the MFP 10, etc.) are described with each device (e.g., the MFP 10, etc.) as a subject, not with its CPU described as the subject.

An initial state of FIG. 3 is a state after completion of a registration process for using a storing service provided by the storing SP server 600. Therefore, the service ID "sv1" and the access token "AT1" are stored in association with each other in the service table 38 of the MFP 10. The device ID "dv1", the service ID "sv1", the destination URL "URL 50", and the access token "AT1" are stored in association with each other in the mediation table 438 of the mediation server 400. The storing SP server 600 stores the access token "AT1".

The MFP 10 accepts a storing service selection operation requesting acceptance of provision of a storing service in T10. When accepting a scan setting operation for setting a scan setting (e.g., document size "A3", resolution "300 dpi") in T12, the MFP 10 executes a scan of a document placed on the MFP 10 in T14 in accordance with the previously set up scan settings, thus generates scan data SDL Next, in T20, the MFP 10 sends an upload destination URL request including the device ID "dv1" and the service ID "sv1" to the mediation server 400. The upload destination URL request is a signal for requesting a URL indicating a position in which the scan data SD1 is to be stored.

When receiving the upload destination URL request from the MFP 10 in T20, the mediation server 400 identifies the device ID "dv1" and the service ID "sv1" in the request, and identifies the destination URL "URL 50" and the access token "AT1" associated with the device ID "dv1" and the service ID "sv1" in the mediation table 438. Then, in T22, the mediation server 400 sends to the storing SP server 600 an upload destination URL request including the URL 50 as the destination URL and including the access token "AT1".

When receiving the upload destination URL request from the mediation server 400 in T22, the storing SP server 600 determines that the access token "AT1" included in this request has already been stored (i.e., authentication has succeeded), and sends an upload destination URL 52 to the mediation server 400 in T30. The upload destination URL 52 is information indicating a position to which the scan, data generated by the MFP 10 is to be sent.

When receiving the upload destination URL 52 from the storing SP server 600 in T30, the mediation server 400 sends a sending instruction including the upload destination URL 52 to the MFP 10 in T32. The sending instruction is a signal instructing that the scan data be sent to the storing SP server 600 by using the URL in this instruction.

When receiving the sending instruction from the mediation server 400 in T32, the MFP 10 sends, to the storing SP server 600, a first upload request including the upload destination URL 52 as the destination URL, and including the scan data SD1 (see T14) and the access token "AT1". Since the sending instruction includes the upload destination URL 52, the MFP 10 can send the scan data SD1 to the appropriate destination.

When receiving the first upload request from, the MFP 10 in T34, the storing SP server 600 determines that the access token "AT1" included in this request has already been stored, and stores the scan data SD1 in T36 in a folder designated by the upload destination URL 52. When T36 is completed, the scan process using the storing service ends.

Thereafter, the user can download the scan data SD1 by, for example, using the terminal device 200 to access the folder in which the scan data SD1 is stored. Further, the user can, for example, access the folder in which foe scan data SD1 is stored, download foe scats data SDL and cause foe MFP 10 to execute printing using the scan data SD1 by using the MFP 10.

Figure 4:
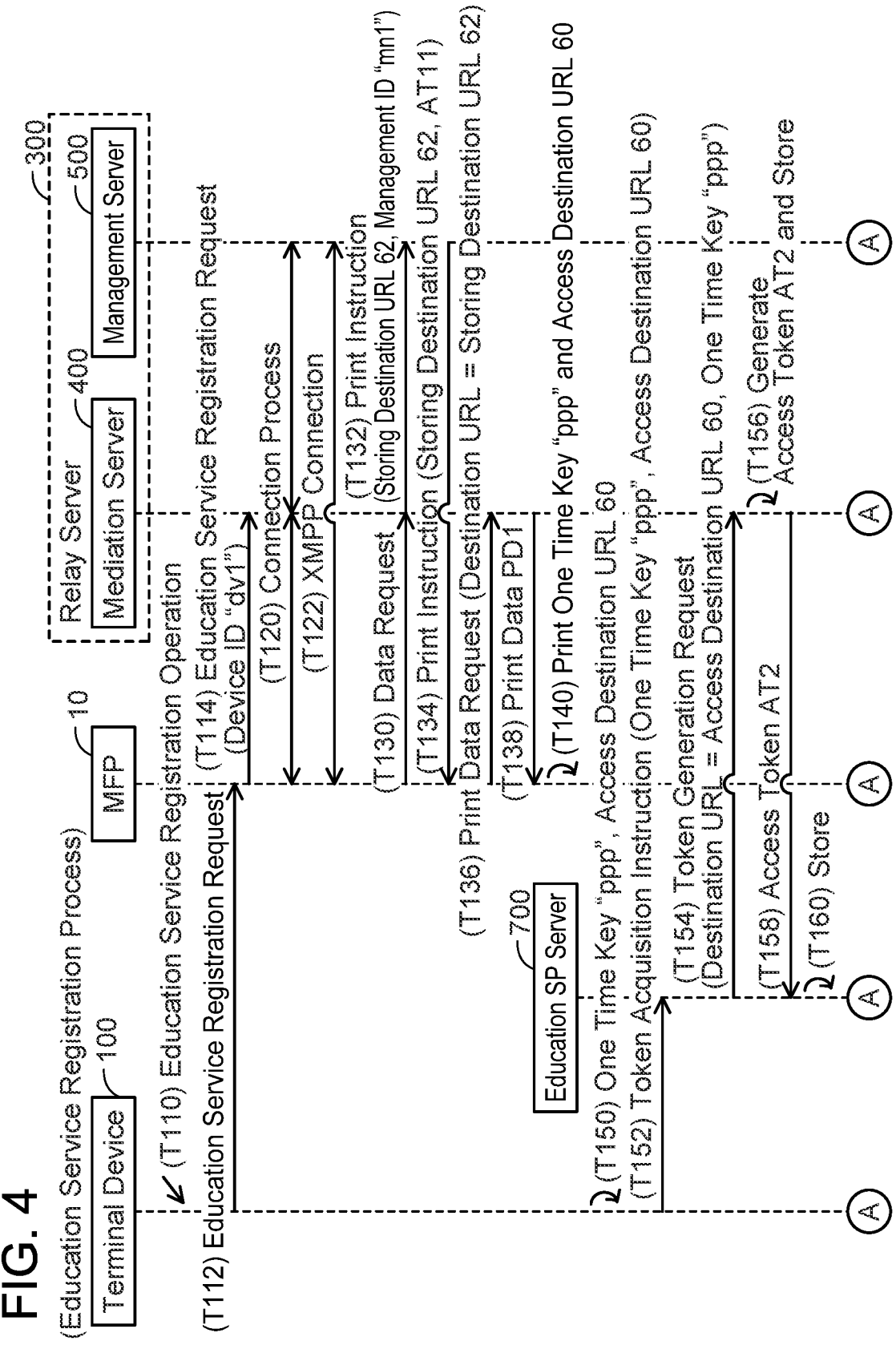
FIG. 4 snows a sequence view of a registration process for using an education service.

(Education Service Registration Process; FIG. 4)

Next, a registration process for receiving provision of an education service provided by the education SP server 700 will be described with reference to FIG. 4. In an initial state of FIG. 4, information for receiving foe education service provided by the education SP server 700 is not stored in the tables 38, 438, 538.

When a contract for receiving provision of the education, service has been signed between foe user using the MFP 10 and the provider of the education service, a serviceman is dispatched to foe users home. Then, the terminal device 100 of the serviceman is temporarily connected with the LAN 4. Thereafter, the serviceman executes an operation for the user to receive provision of the education service.

When accenting an education service registration operation for receiving provision of the education service in T110, the terminal device 100 sends an education service registration request to the MFP 10 in T112.

When receiving the education service registration request from the terminal device 100 in T112, the MFP 10 sends the education service registration request including foe device ID "dv1" to the mediation server 400 in T114. Thereafter, in T120, a connection process for establishing an XMPP (Extensible Messaging and Presence Protocol) connection between the MFP 10 and the management server 500 is executed among the MFP 10, the mediation server 400, and the management server 500.

Specifically, in the connection process, the mediation server 400 stores in the mediation table 438 the device ID "dv1" included in the education service registration request, and sends the device ID "dv1" to the management server 500. When, receiving the device ID "dv1" from the mediation server 400, the management server 500 generates a management ID "mn1", stores the device ID "dv1" and the management ID "mn1" in association with one another in the management table 538, and semis the management ID "mn1" to the mediation server 400. When receiving the management ID "mn1" item the management server 500 the mediation server 400 stores the management ID "mn1" in association with the device ID "dv1" in the mediation table 438.

Further, the management server 500 generates a PIN code, and sends this PIN code to the MFP 10 via the mediation server 400. Next, when receiving the PIN code from, the MFP 10, the management server 500 generates an access token "AT11", stores the access token "AT11" in association with the management ID "mn1" in the management, table 538, and sends the access token "AT11" to the MFP 10. When receiving the access token "AT11" from the management server 500, the MFP 10 stores the access token "AT11" in the service table 38, and establishes the XMPP connection with the management server 500 by using the access token "AT11". Thereby, in T122, the XMPP connection is established between the MFP 10 and the management server 500. The XMPP connection is a so-called constant connection, and is a connection that remains established until the MFP 10 is tamed off. By using the XMPP connection, the management server 500 can send a request to the MFP 10 over the firewall of the LAN 4 to which the MFP 10 belongs without receiving a request from the MFP 10.

In T130, the MFP 10 sends a data request to the mediation server 400. A data request is a signal for causing the MFP 10 to print information necessary for the education SP server 700 and the mediation server 400 to store an access token used for communication between the education SP server 700 and the mediation server 400.

In T130, when receiving the data request from the MFP 10, the mediation server 400 generates a one time key "ppp", and temporarily stores the one time key "ppp" in association with the device ID "dv1" in the mediation table 438. Next, in T132 the mediation server 400 sends, to the management server 500, a print instruction including a storing destination URL 62 indicating a position where the print data corresponding to a specific image is stored, and the management ID "nm1". The specific image is an image showing the one time key "ppp" and the access destination URL 60 for accessing the mediation server 400.

When receiving the print instruction from the mediation server 400 in T132, the management server 500 identifies the management ID "mn1" in the print instruction, identifies the access token "AT11" associated with the management ID "mn1" in the management table 538, and sends a print instruction including the storing destination URL 62 and the access token "AT11" to the MFP 10 in T134.

When receiving the print instruction from the management server 500 in T134, the MFP 10 determines that the access token "AT11" included in the print instruction has already been stored, and sends a print data request including the storing destination URL 62 as the destination URL to the mediation server 400 in T136.

When receiving the print data request from the MFP 10 in T136, the mediation server 400 identifies the print data stored in the position shown by the storing destination URL 62 in the request, and sends the print data to the MFP 10 in T138.

When receiving the print data from the mediation server 400 in T138, the MFP 10 executes printing of the image corresponding to the print data (i.e., the one time key "ppp", and the access destination URL 60) in T140.

When accepting input of the one time key "ppp" and the access destination URL 60 in T150, the terminal device 100 sends a token acquisition instruction including the one time key "ppp" and the access destination URL 60 to the education SP server 700 in T152. The token acquisition instruction is a signal tor causing the education SP server 700 to acquire an access token used in communication with the mediation server 400.

When receiving the token acquisition instruction from the terminal device 100 in T152, the education SP server 700 sends, to the mediation server 400, a token generation request including the access destination URL 60 as the destination URL and including the one time key "ppp" in T154.

When receiving the token generation request from the education SP server 700 in T154, the mediation server 400 determines that the one time key "ppp" in the request has already been stored, and generates an access token "AT2" in T156, and stores the access token "AT2" in association with the one time key "ppp" in the mediation table 438. Next, in T158, the mediation server 400 sends the access token. "AT2" to the education SP server 700.

When receiving the access token "AT2" from the mediation server 400 in T158, the education SP server 700 stores the access token "AT2" in T160. Next, in T170 of FIG. 5, the education SP server 700 sends a scan capability request including the access token "AT2" to the mediation server 400. The scan capability request is a signal for requesting sending of the scan capability that the MFP 10 is capable of executing.

When receiving the scan capability request from the education SP server 700 in T170, the mediation server 400 determines that the access token "AT2" in the request has already been stored, identifies the management ID "mn1" associated with the access token "AT2" in the mediation table 438, and sends a scan capability request including the management ID "mn1" to the management server 500 in T172.

When receiving the scan capability request from the mediation server 400 in T172, the management server 500 identifies, in the management, table 538, the access token "AT11" associated with the management ID "mn1" in toe request, and sends the scan capability request including the access token "AT11" to the MFP 10.

When receiving the scan capability request from the management server 500 in T174, the MFP 10 determines that the access token "AT11" in the request has already been stored, and sends the scan capability of toe MFP 10 (document size "A3, A4", resolution "300 dpi, 1200 dpi") to the management server 500 in T176.

When receiving the scan capability from toe MFP 10 in T176, the management server 500 sends the scan capability to toe terminal device 100 in T178 via toe mediation server 400 and the education SP server 700.

When receiving the scan capability from toe education SP server 700 in T178, the terminal device 100 displays a scan setting screen in T180. Next, toe terminal device 100 accepts a scan setting operation for setting a scan setting ("A4, 300 dpi") for using the education service in T182, and sends a setting registration instruction including the scan setting ("A4, 300 dpi") to the education SP server 700 in T184.

When receiving the setting registration instruction from the terminal device 100 in T184, the education SP server 700 sends, to the mediation server 400, a setting registration instruction including the scan setting ("A4, 300 dpi"), a URL 70 indicating a position to which scan data is to be sent, and the access token "AT2" in T186.

When receiving the setting registration instruction from the education SP server 700 in T186, the mediation server 400 generates a service ID "sv2" for identifying the education SP server 700 in T188, and stores the service ID "sv2" and the URL 70 in the mediation table 438 in association with the access token "AT2". Next, the mediation server 400 identifies, in the mediation table 438, the management ID "mn1" associated with the access token "AT2" in this instruction, and sends a setting registration instruction including the scan setting ("A4, 300 dpi"), the service ID "sv2", and the management ID "mn1" to the management server 500 in T190.

When receiving the setting registration instruction from the mediation server 400 in T190, the management server 500 identifies from the management table 538 the access token "AT11" associated with the management ID "mn1" in this instruction, and sends a setting registration instruction including the scan setting ("A4, 300 dpi"), the service ID "sv2", and the access token "AT11" to the MFP 10 in T192.

When receiving the setting registration instruction from the management server 500 in T192, the MFP 10 stores in the service table 38 the scan setting ("A4, 300 dpi") and the service ID "sv2" in association with the access token "AT11" in T194. When T194 is completed, the registration process for receiving provision of the education service ends.

(Print Process Using Education Service)

Next, a print process using the education service will be described with reference to FIG. 6. An initial state of FIG. 6 is a state after FIG. 5. That is, information for receiving the education service provided by the education SP server 700 is stored in the tables 38, 438, 538.

When accepting an image data selection operation for selecting printing of an image file showing an answer sheet provided by the education SP server 700 in T310, the terminal device 200 sends a print capability request to the MFP 10 in T312 via the education SP server 700, toe mediation server 400, and the management server 500. The print capability request is a signal for requesting sending of a print capability that the MFP 10 is capable of executing. In T314, the terminal device 200 receives the print capability (document size "A3, A4", number of colors "color, monochrome") from the MFP 10 via the management server 500, the mediation server 400, and the education SP server 700, and displays a print setting screen for setting the print setting in T322. The print setting screen includes a paper selection field for selecting a type of printing paper and a number of colors selection field for selecting the number of colors. In T324, the terminal device 200 accepts a print setting operation for setting the paper size "A4" and the number of colors "color" as the print setting, and accepts a print operation that instructs execution of printing in accordance with the aforementioned print conditions. Then, in T330, the terminal device 200 sends to the education SP server 700 a print instruction including the print setting "A4, color" and a file name FI of the image file selected in T310.

When receiving the print instruction from the terminal device 200 in T330, the education SP server 700 identifies image data ID1 corresponding to the file name FI in the print instruction, and sends a print instruction including the image data ID1, the access token "AT2", and the print setting "A4, color" to the mediation server 400 in T332.

When receiving the print instruction from the education SP server 700 in T332, the mediation server 400 determines that the access token "AT2" included in the print instruction has already been stored, and converts the image data ID1 included in the print instruction to print data PD1 having a data format that can be interpreted by the MFP 10 in T334. Next, the mediation server 400 identifies, in the mediation table 438, the management ID "mn1" associated with the access token "AT2" in the print instruction, and sends reception, information including the management ID "mn1" to the management server 500 in T336. The reception information is a signal indicating that, image data has been received from the education SP server 700.

When receiving the reception information from the mediation server 400 in T336, the management server 500 generates a unique job ID "job1" in T340, and sends the job ID "job1" to the mediation server 400 in T342.

When receiving the job ID "job1" from the management server 500 in T342, the mediation server 400 stores the job ID "job1" in association with the access token "AT2" in the mediation table 438, and stores the print data PD1 (see T334), the job ID "job1", and a storing destination URL 64 in association with one another in the job table 440 in T344. The storing destination URL 64 is information indicating a position in which the print data PD1 is stored. Next, in T346, the mediation server 400 sends the job ID "job1" to the education SP server 700.

When receiving the job ID "job1" from the mediation server 400 in T346, the education SP server 700 stores the job ID "job1." and the access token "AT2" in association with one another in T348. Next, in T350, the education SP server 700 sends the job ID "job1" to the terminal device 200.

When receiving the job ID "job1" from the education SP server 700 in T350, the terminal device 200 stores the job ID "job1" in T352.

Further, the mediation server 400 identifies, in the mediation table 438, the management ID "mn1" associated with the access token "AT2" in the print instruction received in T332, and sends a print instruction including the storing destination URL 64 and the management ID "mn1" to the management server 500 in T360.

When receiving the print instruction from the mediation server 400 in T360, the management server 500 identifies, from the management table 538, the access token "AT11" associated with the management ID "mn1" in the print instruction, and sends a print instruction including the storing destination URL 64 and the access token "AT11" to the MFP 10 in T362.

When receiving the print instruction from the management server 500 in T362, the MFP 10 determines that the access token "AT11" in the print instruction has already been stored, and sends to the mediation server 400 a print data request including the storing destination URL 64 as the destination URL in T364.

When receiving the print data request from the MFP 10 in T364, the mediation server 400 identifies the print data PD1 stored at the position indicated by the storing destination URL 64 in the request, and sends the print data PD1 to the MFP 10 in T366.

When receiving the print data PD1 from the mediation server 400 in T366, the MFP 10 executes printing in T368 using the print data PD1. Thereby, the answer sheet is printed. When T368 is completed, the print process using the education service ends.

Figure 7:
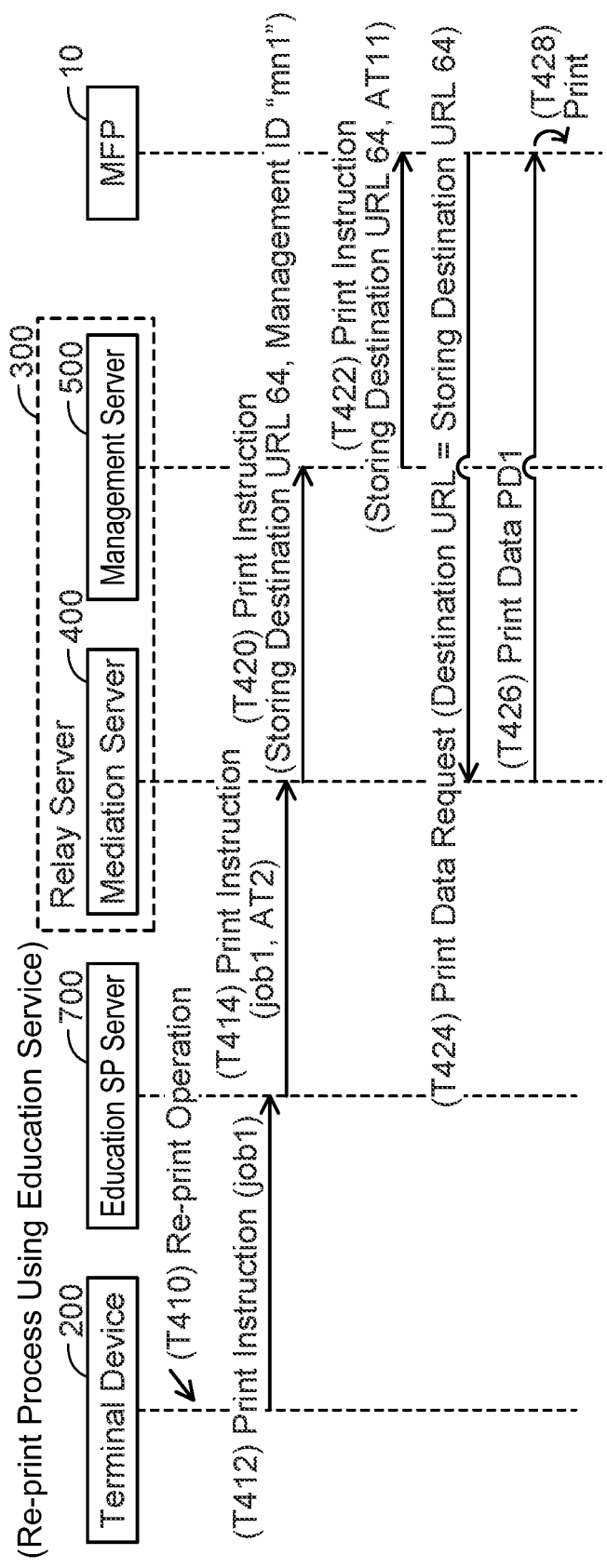
FIG. 7 shows a sequence view of a re-print process using the education service.

(Re-Print Process Using Education Service; FIG. 7)

Next, a re-print process using the education service will be described with reference to FIG. 7. An initial state of FIG. 7 is a state after FIG. 6. The re-print process is executed in a case where the user has lost the answer sheet printed in the print process of FIG. 6, or the like.

When accepting a re-print operation instructing re-printing of the print data PD1 corresponding to the job ID "job1" in T410, the terminal device 200 sends a print instruction including the job ID "job1" to the education SP server 700 in T412.

When receiving the print instruction from the terminal device 200 in T412, the education SP server 700 identifies the access token "AT2" associated with the job ID "job1", and sends a print instruction including the job ID "job1" and the access token "AT2" to the mediation server 400 in T414.

When receiving the print instruction from the education SP server 700 in T414, the mediation server 400 determines that the access token "AT2" in the print instruction has already been stored. Next, the mediation server 400 identifies, in the mediation table 438, the management ID "mn1" associated with the access token "AT2" in the print instruction, and identifies, in the job table 440, the storing destination URL 64 associated with the job ID "job1" in the print, instruction. T420 to T428 to be executed thereafter are the same as T360 to T368 of FIG. 6. Thereby, the image file (i.e., answer sheet) corresponding to the print data PD1 is re-printed.

Figure 8:
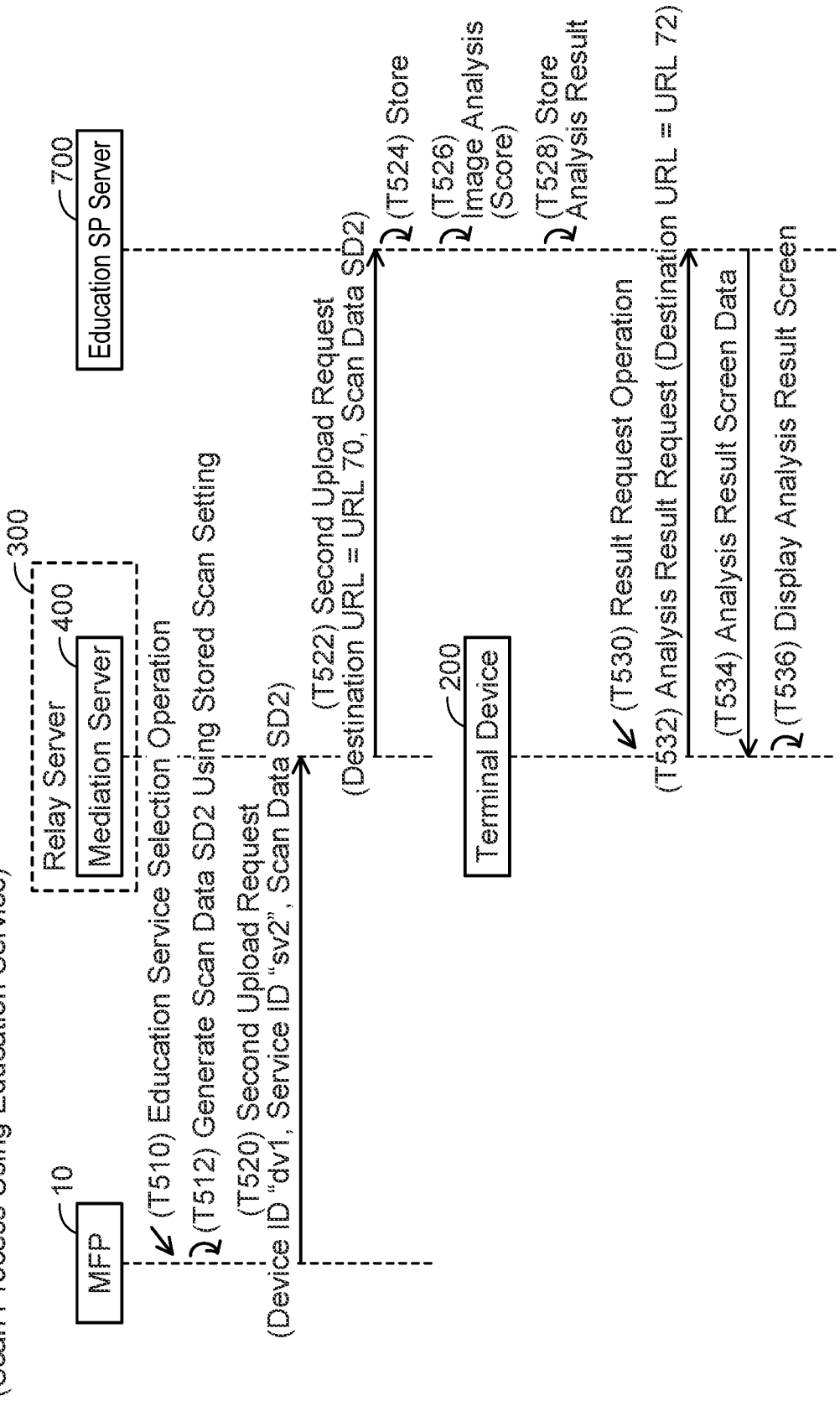
FIG. 8 shows a sequence view of a scan process using the education service.

(Scan Process Using Education Service; FIG. 8)

Next, a scan process using the education service will be described with reference to FIG. 8. The scan process is executed in a case where the answer sheet printed in FIG. 6 or FIG. 7 has been filled out.

When accepting an education service selection operation that instructs execution of a scan using the education service in T510, the MFP 10 identifies the scan setting "A4, 300 dpi" associated with the service ID "sv2" in the service table 38, and in T512, executes a scan of the answer sheet placed on the MFP 10 by using the identified scan setting "A4, 300 dpi" and generates scan, data SD2. Next, in T520, the MFP 10 sends a second upload request including the device ID "dv1", the service ID "sv2", and the scan data SD2 to the mediation server 400.

When receiving the second upload request from the MFP 10 in T320, the mediation server 400 identifies, in the mediation table 438, a destination URL 70 associated with the service ID "sv2" in the request, and sends to the education SP server 700 a second upload request including the URL 70 as the destination URL and including the scan data SD2 in T522. The mediation server 400 temporarily stores the scan data SD2 in the second upload request in a buffer memory, but deletes the scan data SD2 from the buffer memory after completing sending of the scan data. SD2 to the education SP server 700. That, is, the mediation server 400 is not storing the scan data SD2 after T522. As described above, since the second upload request includes the service ID "sv2" identifying the education SP server 700, the mediation server 400 can recognize an appropriate SP server to be used for the expected service.

When receiving the second upload request from the mediation server 400 in T522, the education SP server 700 stores the scan data SD2 in T524. Next, in T526, the education SP server 700 executes image analysis. Specifically, the education SP server 700 scores and corrects the answer indicated by the scan data SD2. Next, in T528, the education SP server 700 stores the analysis result (i.e., scored result) in a folder indicated by a URL 72.

When accepting a result request operation for confirming the scored result in T330, the terminal device 200 sends an analysis result request including the URL 72 as the destination URL to the education SP server 700 in T532, receives from the education SP server 700 analysis result screen data for displaying an analysis result screen in T534, and displays the analysis result screen in T536. The user knows in advance the URL 72 indicating the position of the folder in which the analysis result is stored. Thereby, the user of the terminal device 200 can acknowledge the analysis result (i.e., scored result) of the answer sheet.

Effect of Present Embodiment

In the case where the relay server 300 receives, from the MFP 10, the upload destination URL request requesting provision of the storing service by the storing SP server 600 (T22 of FIG. 3), the relay server 300 sends the sending instruction to the MFP 10 (T32). Then, when receiving the sending instruction from the relay server 300 (T32), the MFP 10 sends the scan data SD1 to the storing SP server 600 without an intervention of the relay server 300. Further, in the case where the relay server 300 receives, from the MFP 10, the second upload request requesting provision of the education service by the education SP server 700 (T520 of FIG. 8), the relay server 300 sends the scan data SD2 received from the MFP 10 to the education SP server 700 (T522). Consequently, the relay server 300 can realize the sending of each of the scan data SD1 and the scan data SD2 to corresponding one of the storing SP server 600 and the education SP server 700 from the MFP 10 by different methods.

Further, in the case where the relay server 300 receives, from the MFP 10, the upload destination URL request not including the scan data SD1 to be sent to the storing SP server 600 (T22 of FIG. 3), the relay server 300 sends the sending instruction to the MFP 10 (T32). Then, when receiving the sending instruction from the relay server 300 (T32), the MFP 10 sends the scan data SD1 to the storing SP server 600 without an intervention of the relay server 300. Further, in the case where, the relay server 300 receives, from the MFP 10, the second upload request including the scan data SD2 to be sent from the MFP 10 to the education SP server 700 (T520 of FIG. 8), the relay server 300 sends the scan data SD2 included in the second upload request to the education SP server 700 (T522). Consequently, the relay server 300 can realize the sending of each of the scan data SD1 and the scan data SD2 to corresponding one of the storing SP server 600 and the education SP server 700 from the MFP 10 by different methods.

The scan data sent from the MFP 10 to the relay server 300 may include personal information. Therefore, it is desirable that the scan data can be sent to the storing SP server 600 without sending the scan data to the relay server 300 that is different from the server providing the storing service. Therefore, in the present embodiment, when the relay server 300 receives the upload destination URL request from the MFP 10 (T20 of FIG. 3), the relay server 300 sends the sending instruction to the MFP 10 (T32). In this case, the MFP 10 sends the scan data SD1 to the education SP server 700 without art intervention of the relay server 300 (T34). Consequently, the security of the personal information included in the scan data SD1 can be enhanced. On the other hand, for example, in a case where the education SP server 700 is a server whose server function is updated relatively frequently, the sending of scan data from the MFP 10 to the education SP server 700 may fail unless the firmware of the MFP 10 is updated in accordance with the update of the server function of the education SP server 700. However, it is troublesome for a user of the MFP 10 to update the firmware of the MFP 10 in accordance with the update of the server function of the education SP server 700. Therefore, in the present embodiment, the MFP 10 sends the second upload request to the relay server 300. Then, when the relay server 300 receives the second upload request from the MFP 10 (T520 of FIG. 8), the relay server 300 sends the scan data SD2 received from the MFP 10 to the education SP server 700 (T522). In this case, the server function of the relay server 300 may be updated in accordance with the update of the server function of the education SP server 700. Updating the server function of the relay server 300 is easier than updating the firmware of the MFP 10. Consequently, it is possible to easily catch up with the update of the server function of the education SP server 700.

As described above, the relay server 300 receives the image data ID1 from the education SP server 700 (T332 of FIG. 6), and sends to the MFP 10 the print data PD1 obtained by using the image data ID1 (T366). That is, the relay server 300 can relay both the upload service of supplying the scan data SD2 from the MFP 10 to the education SP server 700, and the download service of supplying the print data PD1 from the education SP server 700 to the MFP 10.

The user may lose the answer sheet printed in the print process of FIG. 6. Since personal information is not included in the image data ID1 corresponding to the answer sheet received from the education SP server 700, the security of the personal information is not reduced even when the relay server 300 stores the print data PD1 corresponding to the image data ID1. According to the aforementioned configuration, in the case of receiving the print data request from the MFP 10 (T424) after printing using the print data PD1 has been executed, the relay server 300 sends the print data PD1 in the memory 434 to the MFP 10. Thereby, the MFP 10 can re-print the image file (i.e., answer sheet) corresponding to the print data PD1. In this case, the user does not need to re-select the image file. Consequently, user convenience can be improved.

Figure 5:
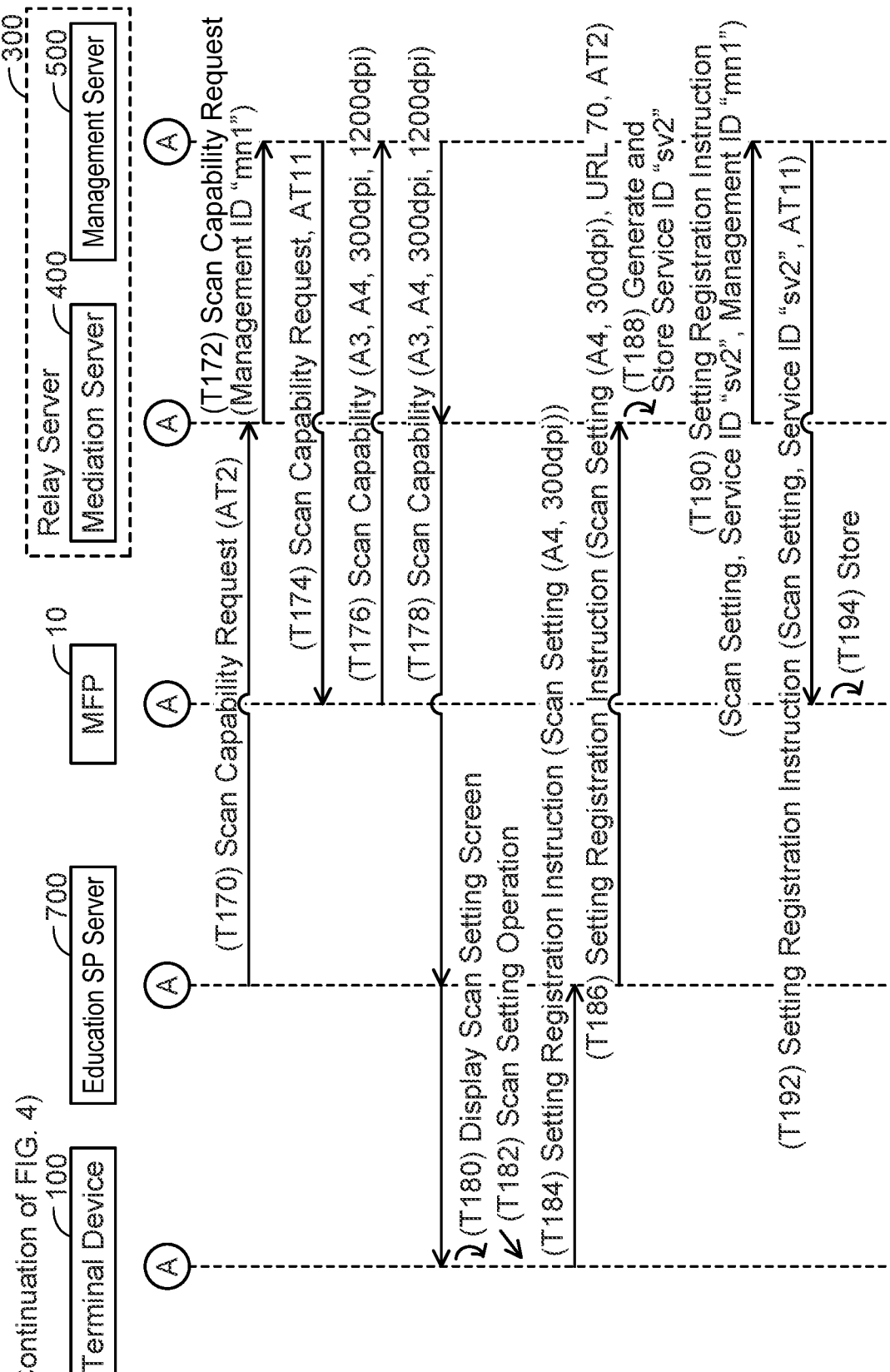
FIG. 5 shows a sequence view of a continuation of FIG. 4.
Figure 6:
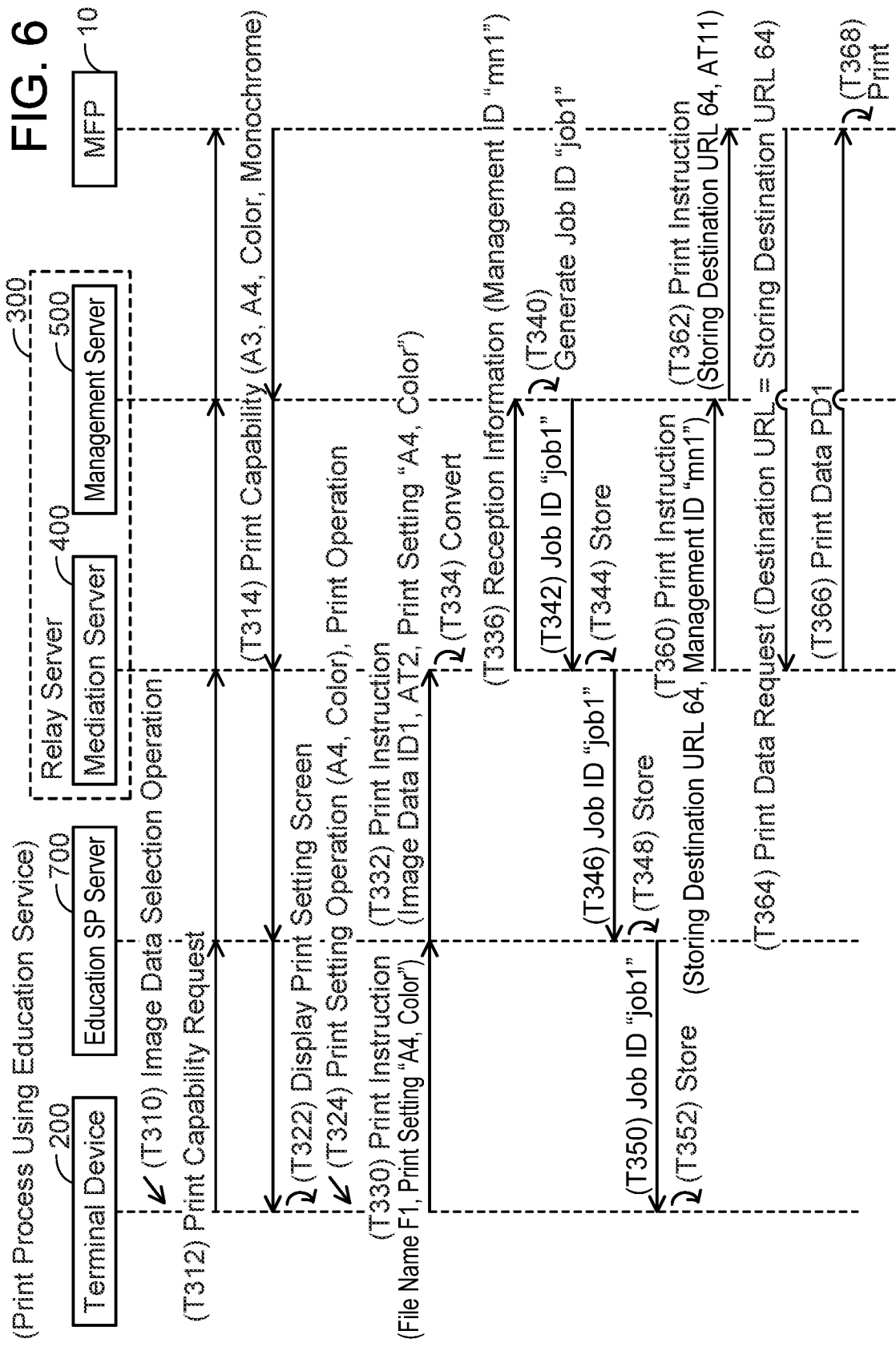
FIG. 6 shows sequence view of a print process using the education service.

Further, the relay server 300 sends the scan setting "A4, color" to the MFP 10 in T192 of FIG. 5, which is executed before the education service selection operation of T510 of FIG. 8. According to such a configuration, the time between acceptance of the education service selection operation and generation of the scan data S132 can be shortened as compared to a configuration in which the scan setting is received from the relay server 300 after the education service selection operation has been accepted.

(Corresponding Relationships)

The MFP 10 is an example of "communication device". The storing SP server 600, the education SP server 700 are examples of "first service providing server", "second service providing server", respectively. The upload destination URL request of T20 of FIG. 3 is an example of "first service request". The scan data. SD1 is an example of "first target data". The second upload request of T520 of FIG. 8 is an example of "second service request". The scan data SD2 is an example of "second target data". The upload destination URL 52 is an example of "first position information". The memory 434 of the mediation server 400 is an example of "memory" of "relay server". The print data request of T424 of FIG. 7 is an example of "re-sending request".

The mediation server 400, the management server 500 are examples of "first server", "second server", respectively. The XMPP connection is an example of "constant connection". The storing destination URL 64 is an example of "second position information". The print data request of T364 of FIG. 6 is an example of "sending request". The service ID "sv2" is an example of "server identification information". The storing service selection operation of T10 of FIG. 3 is an example of "an operation to use the first service". The scan setting set in T12 of FIG. 3 is an example of "first scan setting". The scan setting of T192 of FIG. 5 is an example of "second scan setting". The education service selection operation of T510 of FIG. 8 is an example of "an operation to use the second service".

T20, T32 of FIG. 3 are examples of processes executed by "receive a first service request", "send a sending instruction", respectively. T520, T522 of FIG. 8 are examples of processes executed by "receive a second service request", "send the second target data", respectively.

Second Embodiment

Next, a second embodiment will be described. In the second embodiment, the scan setting is not stored in the service table 38 of the MFP 10. In the case of the present embodiment, the scan setting is not included in the setting registration instructions of T186, T190, T192 of FIG. 5. That is, in the registration process tor using the education service, the MFP 10 does not store the scan setting. In the present embodiment, when the education SP server 700 receives the setting registration instruction from the terminal device 100 in T184, the education SP server 700 stores the scan setting ("A4, 300 dpi") in this instruction in association with the access token "AT2".

Figure 9:
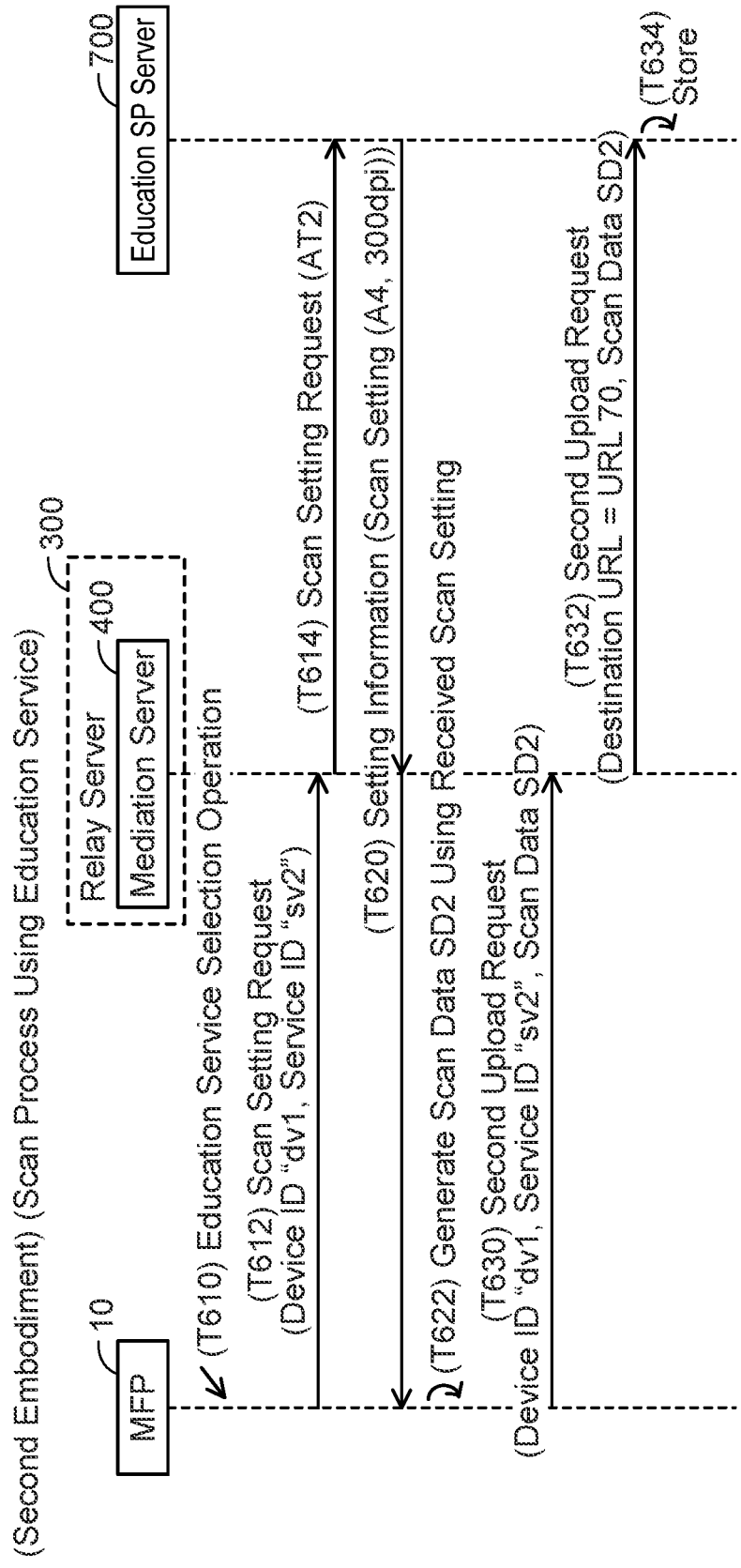
FIG. 9 shows a sequence view of a print process using the education service in a second embodiment.

(Scan Process Using Education Service; FIG. 9)

A scan process using the education service will be described with reference to FIG. 9. T610 is the same as T510 of FIG. 8. In T612, the MFP 10 sends a scan setting request including the device ID "dv1" and the service ID "sv2" to the mediation server 400.

When receiving the scan setting request from the MFP 10 in T612, the mediation server 400 identifies, in, the mediation table 438, the access token "AT2" associated with the device ID "dv1" and the service ID "sv2" in the request, and, sends a scan setting request including the access token "AT2" to the education SP server 700 in T614.

When receiving the scan, setting request from the mediation server 400 in T614, the education SP server 700 identifies the scan setting ("A4, 300 dpi") associated with the access token "AT2" in the request, and sends setting information including the scan setting and the access token "AT2" to the MFP 10 in T620 via the mediation server 400.

T622 is the same as T512 of FIG. 8 except that the scan setting received from the education SP server 700 is used. T630 to T634 are the same as T520 to T524. With such a configuration as well, the same effect as that of the first embodiment can be achieved.

(First Variant)

The service provided by the "second service providing server" is not limited to the education service, and may be a questionnaire aggregation service or the like. In the case of the questionnaire aggregation service, aggregation of the questionnaire, and the aggregation result of the questionnaire are examples of "image analysis", "image analysis result", respectively.

(Second Variant)

The relay server 300 may be unable to relay the printing of the image file showing the answer sheet provided by the education SP server 700. In the present variant, "receive image data to be printed", "send print data" can be omitted, (Third Variant)

T344 of FIG. 6 can be omitted. In the present variant, the re-print process of FIG. 7 is not executed. In the present variant, "store the print data", "receive a re-sending request", "re-send the print data" cars be omitted.

(Fourth Variant)

"Relay server" may be configured by a single server alone.

(Fifth Variant)

The second upload requests of T520 of FIG. 8 and T630 of FIG. 9 may not include the service ID "sv2". In the present variant, the mediation server 400 may identity the education SP server 700 based on whether the request received from the MFP 10 includes scan data.

(Sixth Variant)

In the registration process of FIGS. 4 and 5, the registration instruction of T186 includes the scan setting, but the registration instructions of T190, T192 may not include the scars setting. In the present variant, when the mediation server 400 receives the setting registration instruction from the education SP server 700 in T186, the mediation server 400 stores the scan setting m this instruction in the mediation table 438 in association with the access token "AT2". In the present variant, when the mediation server 400 receives the scan setting request from the MFP 10 in T612 of FIG. 9, the mediation sewer 400 identities, in the mediation table 438, the scan setting associated with the device ID "dv1" and the service ID "sv2" in the request, and sends the setting information including the scan setting to the MFP 10.

(Seventh Variant)

In the above embodiments, the processes of FIG. 3 to FIG. 9 are implemented by software (e.g., the programs 36, 436, 536). Instead of this, one or more of the processes may be implemented by hard ware such as a logic circuit.

What is claimed is:

1. A relay server comprising:
one or more controllers configured to:
receive a first service request from a communication device, the first service request being a signal for requesting provision of a first service from a first service providing server, the first service being a service to store first target data sent by the communication device in the first service providing server;
in a case where the first service request is received from the communication device, send a sending instruction to the communication device, the sending instruction being for instructing to send the first target data to the first service providing server, wherein in a case where the communication device receives the sending instruction from the relay server, the communication device sends the first target data to the first service providing server without an intervention of the relay server;
receive a second service request from the communication device, the second service request being a signal for requesting provision of a second service from a second service providing server different from the first service providing server, the second service request including server identification information identifying the second service providing server, the second service being a service to execute image analysis of second target data sent by the communication device and output a result of the image analysis; and
in a case where the second service request is received from the communication device, send the second target data received from the communication device to the second service providing server identified by the server identification information included in the second service request.

2. The relay server as in claim 1, wherein
the sending instruction includes first position information in the first service providing server,
the first position information indicates a position where the first target data is to be stored, and
in the case where the communication device receives the sending instruction from the relay server, the communication device sends the first target data, without an intervention of the relay server, to the first service providing server with the first position information included in the sending instruction as a destination.

3. The relay server as in claim 1, wherein
the communication device is configured to execute a print function, and
the one or more controllers are further configured to:
receive image data to be printed from the second service providing server; and
in a case where the image data is received from the second service providing server, send print data obtained by using the image data to the communication device, wherein in a case where the communication device receives the print data from the relay server, the communication device executes printing of an image corresponding to the print data.

4. The relay server as in claim 3 further comprising a memory, wherein
the one or more controllers are further configured to:
in the case where the image data is received from the second service providing server, store the print data in the memory;
after the printing of the image has been executed by the communication device, receive a re-sending request from the communication device, the re-sending request being for requesting re-sending of the print data; and
in a case where the re-sending request is received from the communication device, re-send the print data in the memory to the communication device,
wherein in a case where the communication device re-receives the print data from the relay server, the communication device re-executes printing of the image corresponding to the print data.

5. The relay server as in claim 3, wherein
the relay server comprises a first server and a second server different from the first server,
the second server is configured to establish a constant connection with the communication device,
wherein a controller of the first sever is configured to:
receive the image data to be printed from the second service providing server; and
in the case where the image data is received from the second service providing server by the first server, send to the second server receipt information indicating that the image data has been received,
wherein a controller of the second server is configured to:
in a case where the receipt information is received by the second server from the first server, send second position information in the first server to the communication device, the second position information indicating a position where the print data is to be stored,
wherein the controller of the first sever is further configured to:
after the second position information has been sent to the communication device, receive a sending request including the second position information from the communication device; and
in a case where the sending request is received by the first server from the communication device, send the print data to the communication device.

6. The relay server as in claim 1, wherein
the communication device is configured to execute a scan function,
a scan setting to be used to receive the first service is not sent from the relay server to the communication device,
wherein in a case where the communication device accepts an operation to use the first service, the communication device generates the first target data that is first scan data by using a first scan setting set by a user and sends the first target data to the first service providing server,
wherein the one or more controllers are further configured to:
send a second scan setting to be used to receive the second service to the communication device,
wherein in a case where the communication device accepts an operation to use the second service, the communication device generates the second target data that is second scan data by using the second scan setting received from the relay server and sends the second target data to the relay server.

7. The relay server as in claim 6, wherein
the second scan setting is sent to the communication device before the operation to use the second service is accepted by the communication device.

8. A relay server comprising:
one or more controllers configured to:
receive a first service request from a communication device, the first service request being a signal for requesting provision of a first service from a first service providing server, the first service request not including first target data to be sent from the communication device to the first service providing server;
in a case where the first service request is received from the communication device, send a sending instruction to the communication device, the sending instruction being for instructing to send the first target data to the first service providing server, wherein in a case where the communication device receives the sending instruction from the relay server, the communication device sends the first target data to the first service providing server without an intervention of the relay server;
receive a second service request from the communication device, the second service request being a signal for requesting provision of a second service from a second service providing server different from the first service providing server, the second service request including second target data to be sent from the communication device to the second service providing server; and
in a case where the second service request is received from the communication device, send to the second service providing server the second target data included in the second service request.

9. The relay server as in claim 8, wherein
the first service is a service to store the first target data in the first service providing server, and
the second service is a service to execute image analysis of the second target data and output a result of the image analysis.

10. The relay server as in claim 8, wherein
the sending instruction includes first position information in the first service providing server,
the first position information indicates a position where the first target data is to be stored, and
in the case where the communication device receives the sending instruction from the relay server, the communication device sends the first target data, without an intervention of the relay server, to the first service providing server with the first position information included in the sending instruction as a destination.

11. The relay server as in claim 8, wherein
the communication device is configured to execute a print function, and
the one or more controllers are further configured to:
receive image data to be printed from the second service providing server; and
in a case where the image data is received from the second service providing server, send print data obtained by using the image data to the communication device, wherein in a case where the communication device receives the print data from the relay server, the communication device executes printing of an image corresponding to the print data.

12. The relay server as in claim 11 further comprising a memory, wherein
the one or more controllers are further configured to:
in the case where the image data is received from the second service providing server, store the print data in the memory;
after the printing of the image has been executed by the communication device, receive a re-sending request from the communication device, the re-sending request being for requesting re-sending of the print data; and
in a case where the re-sending request is received from the communication device, re-send the print data in the memory to the communication device,
wherein in a case where the communication device re-receives the print data from the relay server, the communication device re-executes printing of the image corresponding to the print data.

13. The relay server as in claim 11, wherein
the relay server comprises a first server and a second server different from the first server,
the second server is configured to establish a constant connection with the communication device,
wherein a controller of the first sever is configured to:
receive the image data to be printed from the second service providing server; and
in the case where the image data is received from the second service providing server by the first server, send to the second server receipt information indicating that the image data has been received,
wherein a controller of the second server is configured to:
in a case where the receipt information is received by the second server from the first server, send second position information in the first server to the communication device, the second position information indicating a position where the print data is to be stored,
wherein the controller of the first sever is further configured to:
after the second position information has been sent to the communication device, receive a sending request including the second position information from the communication device; and
in a case where the sending request is received by the first server of the relay server from the communication device, send the print data to the communication device.

14. The relay server as in claim 8, wherein
the second service request includes server identification information identifying the second service providing server,
wherein the one or more controllers are further configured to:
in the case where the second service request is received from the communication device, send the second target data received from the communication device to the second service providing server identified by the server identification information included in the second service request.

15. The relay server as in claim 8, wherein
the communication device is configured to execute a scan function,
a scan setting to be used to receive the first service is not sent from the relay server to the communication device,
wherein in a case where the communication device accepts an operation to use the first service, the communication device generates the first target data that is first scan data by using a first scan setting set by a user and sends the first target data to the first service providing server,
wherein the one or more controllers are further configured to:
send a second scan setting to be used to receive the second service to the communication device,
wherein in a case where the communication device accepts an operation to use the second service, the communication device generates the second target data that is second scan data by using the second scan setting received from the relay server and sends the second target data to the relay server.

16. The relay server as in claim 15, wherein
the second scan setting is sent to the communication device before the operation to use the second service is accepted by the communication device.

17. A non-transitory computer-readable recording medium storing computer-readable instructions for a relay server,
wherein the computer-readable instructions, when executed by a processor of the relay server, cause the relay server to:
receive a first service request from a communication device, the first service request being a signal for requesting provision of a first service from a first service providing server, the first service being a service to store first target data sent by the communication device in the first service providing server;
in a case where the first service request is received from the communication device, send a sending instruction to the communication device, the sending instruction being for instructing to send the first target data to the first service providing server, wherein in a case where the communication device receives the sending instruction from the relay server, the communication device sends the first target data to the first service providing server without an intervention of the relay server;
receive a second service request from the communication device, the second service request being a signal for requesting provision of a second service from a second service providing server different from the first service providing server, the second service request including server identification information identifying the second service providing server, the second service being a service to execute image analysis of second target data sent by the communication device and output a result of the image analysis; and
in a case where the second service request is received from the communication device, send the second target data received from the communication device to the second service providing server identified by the server identification information included in the second service request.

18. A non-transitory computer-readable recording medium storing computer-readable instructions for a relay server,
wherein the computer-readable instructions, when executed by a processor of the relay server, cause the relay server to:
receive a first service request from a communication device, the first service request being a signal for requesting provision of a first service from a first service providing server, the first service request not including first target data to be sent from the communication device to the first service providing server;
in a case where the first service request is received from the communication device, send a sending instruction to the communication device, the sending instruction being for instructing to send the first target data to the first service providing server, wherein in a case where the communication device receives the sending instruction from the relay server, the communication device sends the first target data to the first service providing server without an intervention of the relay server;
receive a second service request from the communication device, the second service request being a signal for requesting provision of a second service from a second service providing server different from the first service providing server, the second service request including second target data to be sent from the communication device to the second service providing server; and
in a case where the second service request is received from the communication device, send to the second service providing server the second target data included in the second service request.

* * * * *